United States Patent
Chee et al.

(10) Patent No.: US 11,297,226 B1
(45) Date of Patent: Apr. 5, 2022

(54) PHOTO TAKING FEEDBACK SYSTEM

(71) Applicant: Black Sesame International Holding Limited, Santa Clara, CA (US)

(72) Inventors: Evelyn Yi Lyn Chee, Singapore (SG); Yubo Duan, Singapore (SG); Jin Xu, Singapore (SG); Jizhang Shan, Los Gatos, CA (US)

(73) Assignee: BLACK SESAME TECHNOLOGIES INC., San Jose, CA (US)

(*) Notice: Subject to any disclaimer, the term of this patent is extended or adjusted under 35 U.S.C. 154(b) by 0 days.

(21) Appl. No.: 17/061,571

(22) Filed: Oct. 1, 2020

(51) Int. Cl.
| | |
|---|---|
| *H04N 5/232* | (2006.01) |
| *G06F 16/48* | (2019.01) |
| *G06F 16/487* | (2019.01) |
| *H04N 5/243* | (2006.01) |
| *H04N 5/235* | (2006.01) |
| *H04N 5/238* | (2006.01) |
| *H04W 4/024* | (2018.01) |

(52) U.S. Cl.
CPC ....... *H04N 5/23225* (2013.01); *G06F 16/487* (2019.01); *G06F 16/489* (2019.01); *H04N 5/23206* (2013.01); *H04N 5/23216* (2013.01); *H04N 5/23218* (2018.08); *H04N 5/23245* (2013.01); *H04N 5/238* (2013.01); *H04N 5/2352* (2013.01); *H04N 5/2353* (2013.01); *H04N 5/243* (2013.01); *H04W 4/024* (2018.02)

(58) Field of Classification Search
CPC .......... H04N 1/00183; H04N 1/32545; H04N 5/23206; H04N 5/23216; H04N 5/23218; H04N 5/23222; H04N 5/23225; H04N 5/23245; G06F 16/487; G06F 16/489
See application file for complete search history.

(56) References Cited

U.S. PATENT DOCUMENTS

| | | | |
|---|---|---|---|
| 10,726,245 B2 | 7/2020 | Wen | |
| 10,768,300 B2 | 9/2020 | Shan et al. | |
| 2011/0050909 A1* | 3/2011 | Ellenby | ................. G03B 17/24 348/207.1 |
| 2011/0314049 A1* | 12/2011 | Poirier | ............... H04N 1/00183 707/769 |
| 2013/0128059 A1* | 5/2013 | Kristensson | ...... H04M 1/72403 348/207.1 |
| 2018/0365856 A1* | 12/2018 | Parasnis | ................... G06T 7/80 |
| 2019/0056503 A1 | 2/2019 | Shan et al. | |

* cited by examiner

Primary Examiner — Daniel M Pasiewicz
(74) Attorney, Agent, or Firm — Timothy T. Wang; Ni, Wang & Massand, PLLC

(57) ABSTRACT

An example photographic feedback method, comprising, inputting a query image, a camera setting, a location, a temporal indicia and an environmental condition, detecting an object within the query image, projecting the location of the object, classifying the environmental condition at the location of the object, querying features of the query image of the object at the environmental condition of the projected location of the object, determining a closest image to the query image for the object at the environmental condition of the projected location of the object having a highly rated value via a cloud database and sending an updated location and at least one updated camera setting for an updated image.

20 Claims, 4 Drawing Sheets

PHOTO TAKING FEEDBACK SYSTEM

BACKGROUND

Technical Field

The instant disclosure is related to convolutional neural networks and specifically to providing photo taking feedback.

Background

Currently, deep learning and artificial intelligence has grown increasingly popular in the mobile industry. In particular, various deep learning techniques may be found implemented in mobile devices and incorporated with cameras, such as image enhancement, face detection and facial recognition.

SUMMARY

An example photographic feedback method, comprising, inputting a query image, a camera setting, a location, a temporal indicia and an environmental condition, detecting an object within the query image, projecting the location of the object, classifying the environmental condition at the location of the object, querying features of the query image of the object at the environmental condition of the projected location of the object, determining a closest image to the query image for the object at the environmental condition of the projected location of the object having a highly rated value via a cloud database and sending a location and at least one camera setting for an updated image.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
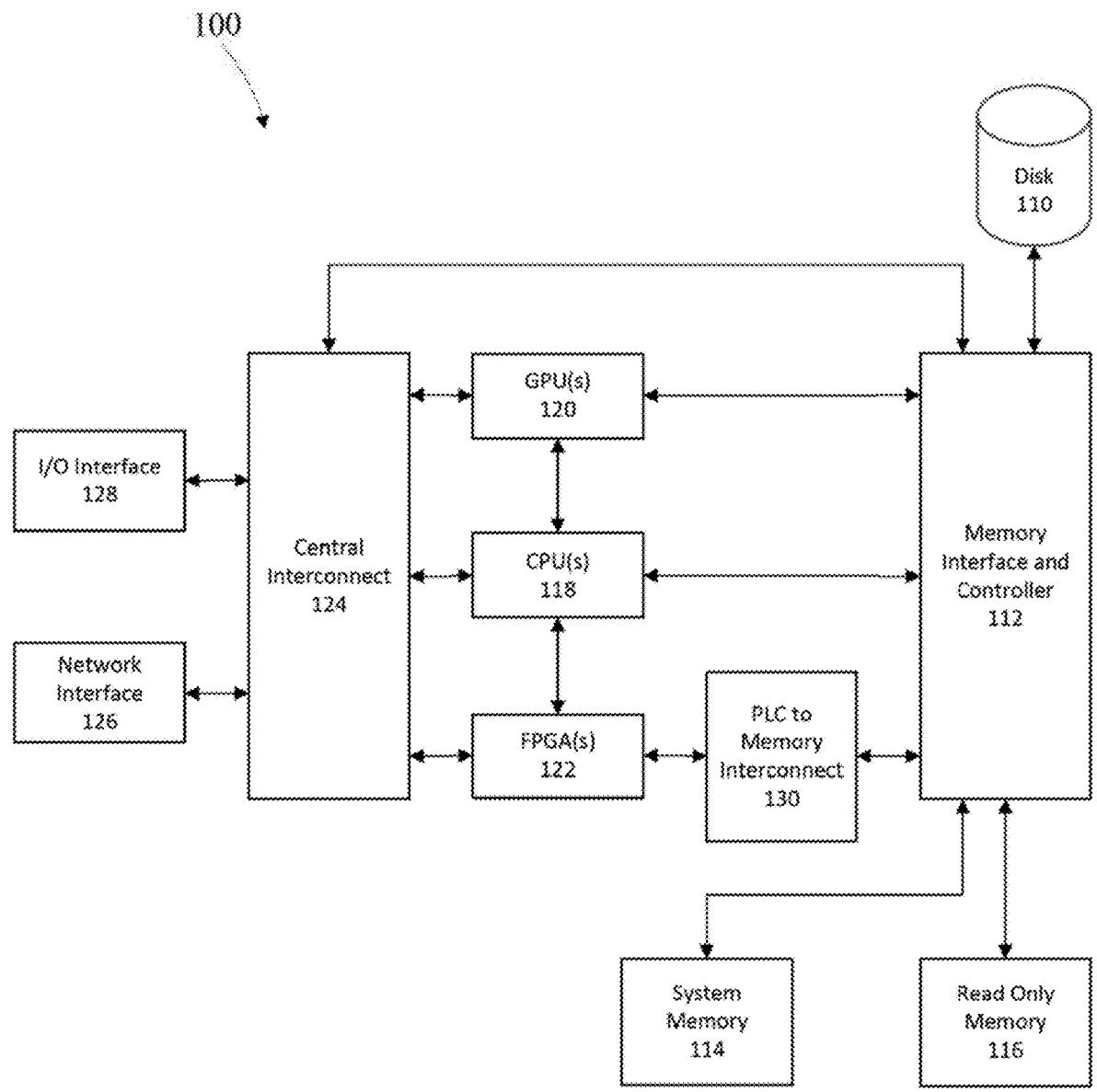
FIG. 1 is a first example system diagram in accordance with one embodiment of the disclosure.

FIG. 1 depicts an example hybrid computational system 100 that may be used to implement neural nets associated with the operation of one or more portions or steps of process 600. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
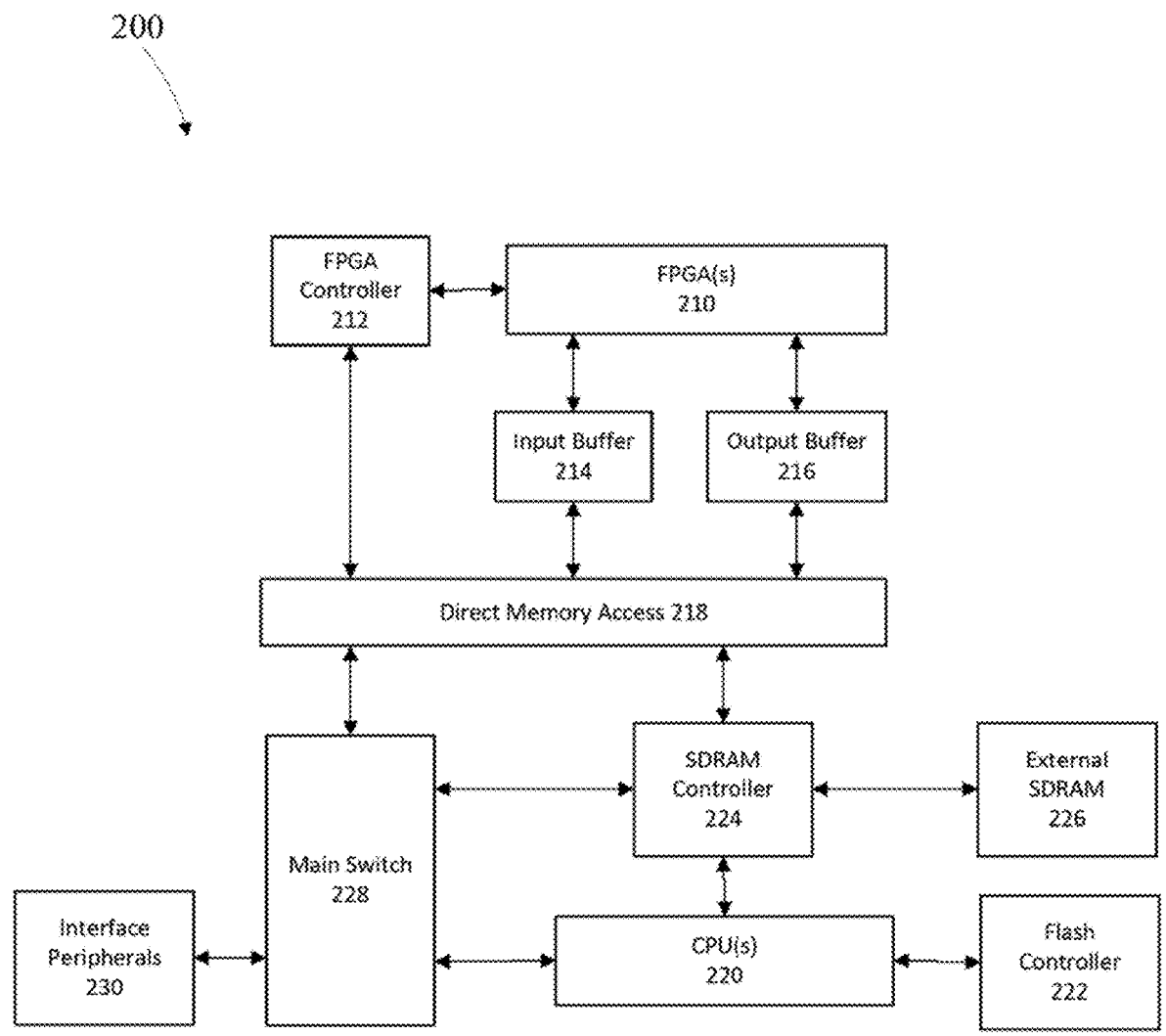
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

Currently, there are multiple post-processing techniques that may be applied to photographs to provide for increased resolution, brightness leveling and the like. Post-processing images to adjust their composition within the photograph and thus, improve the aesthetic quality may be performed. In one operation, photo cropping may be performed so that extraneous contents are removed and the aspect ratio of the photo is modified, which may result in an improved compositional structure. To determine the regions to crop, different approaches have been used such as attention-driven methods which identify the most informative region of an image, aesthetic-driven methods which focus on the overall aesthetic quality of the image and data-driven methods and which train an end-to-end neural network cropping model. The cropping of photos is insufficient to change the relative proportion and position of elements within the photo.

Other post-process operations may be performed such as retargeting the image and moving elements towards an updated position within the photo. The method may include warping, patch rearrangement and seam carving. Another post-processing method that is currently utilized is image overlays that compose multiple images in a single photograph. One potential shortcoming of using these post-processing approaches is that the amount of information to work with is restricted to what is available within the photo which limits how much the photo quality can potentially be improved. Also, using these post-process operations to modify the relative proportion of objects in a realistic manner is problematic.

The current solution modifies the locational setup of a photograph by pre-processing based in part on a query image and camera hardware sensor data. The locational setup may be modified either on a small scale such as panning the photo or changing the angle of the photograph, or a large scale, such as physically moving from a first photo location to an updated location, leading to a better composed photo. Also, updated camera setting, such as ISO, aperture and shutter speed, based on the query image and the camera hardware sensor outputs may have a beneficial effect on the aesthetic quality of photos.

Pre-processing to find an updated location and updated camera settings based in part on a query image and hardware sensor data may help to prevent photographic errors instead of trying to correct them afterwards by relying on post-processing techniques to correct a poor photo. This proposed solution may include improving the composition and quality of the final photo in real-time before the photograph is taken.

In one embodiment, based on a current location and the surrounding conditions of a photograph, directions on how to position the camera and what settings may be used to achieve high-quality results would be provided to the photographer by either suggesting or setting the camera settings and sending directions on where to reposition the photographer or how to recast the composition of the photograph.

One possible part of the proposed solution is the utilization of a cloud database (FIG. 3, 310), containing a collection of photos taken at various locations worldwide and under different environment settings.

Photographs in the cloud database (FIG. 3, 310) may be filtered by undergoing a data cleaning process conducted by photography experts to ensure the database comprises aesthetically pleasing photographs. The database photographs may be rated based on their aesthetic quality and those photos which score below a pre-determined threshold would be removed from the database. In one embodiment the exchangeable image file format (EXIF) data may be stored to provide information regarding the date and time of the photo, the camera settings used, the location, and the like.

Figure 3:
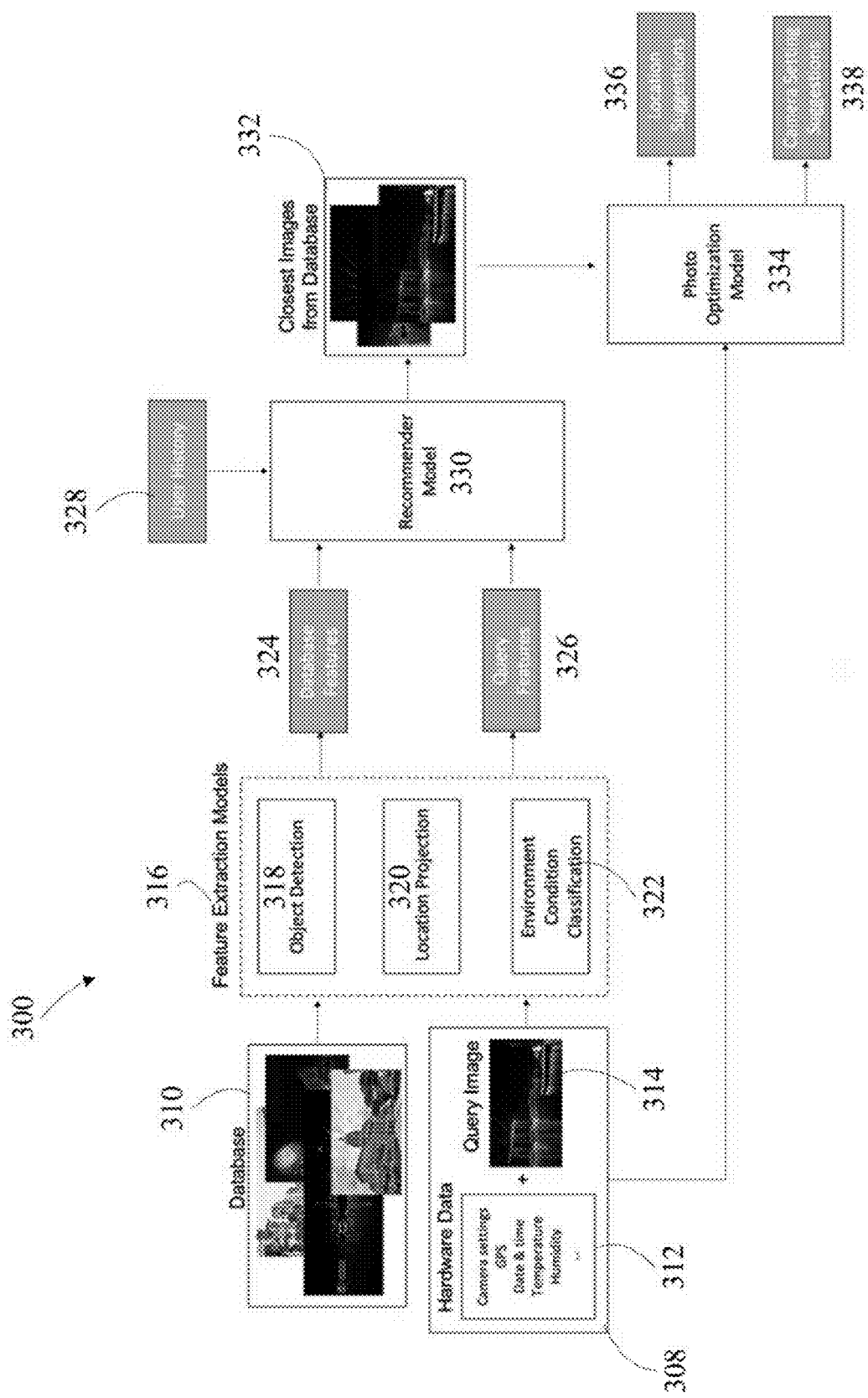
FIG. 3 is an example photographic feedback framework in accordance with one embodiment of the disclosure.

In one embodiment a model would be trained so that as queries are received, the closest images (FIG. 3, 332) would be returned from the cloud database (FIG. 3, 310). The similarity between the proposed photograph and the database images may include a geographical location where the photo is taken, surrounding conditions, objects detected in the image and the like.

One example output of the model would be to recommend similar photos (FIG. 3, 332) as references to improve the quality and composition of the query image (FIG. 3, 314). Due to personal preferences, perceptual assessment about the quality of a photo is subjective and differs between users. Hence, the model may take into account the user's history (FIG. 3, 328) so that future recommended images would incline towards the user's preferences.

Current real-time solutions ignore photographic aspects such as scene content and may retrieve results that are unrelated or unrealistic for the location and environment and only provide example photos as reference feedback for the user. Providing reference photos may not be useful to users as this does not provide actionable items for the photographer to achieve similar results.

The proposed method provides executable actions (FIG. 3, 336, 338) instead of just reference images and makes use of the information from overall image content to retrieve related images.

One example of the proposed solution workflow is shown in FIG. 3. One example of the proposed method instantiates when a camera application is accessed and a user is positioning the camera to take a photo.

Figure 4:
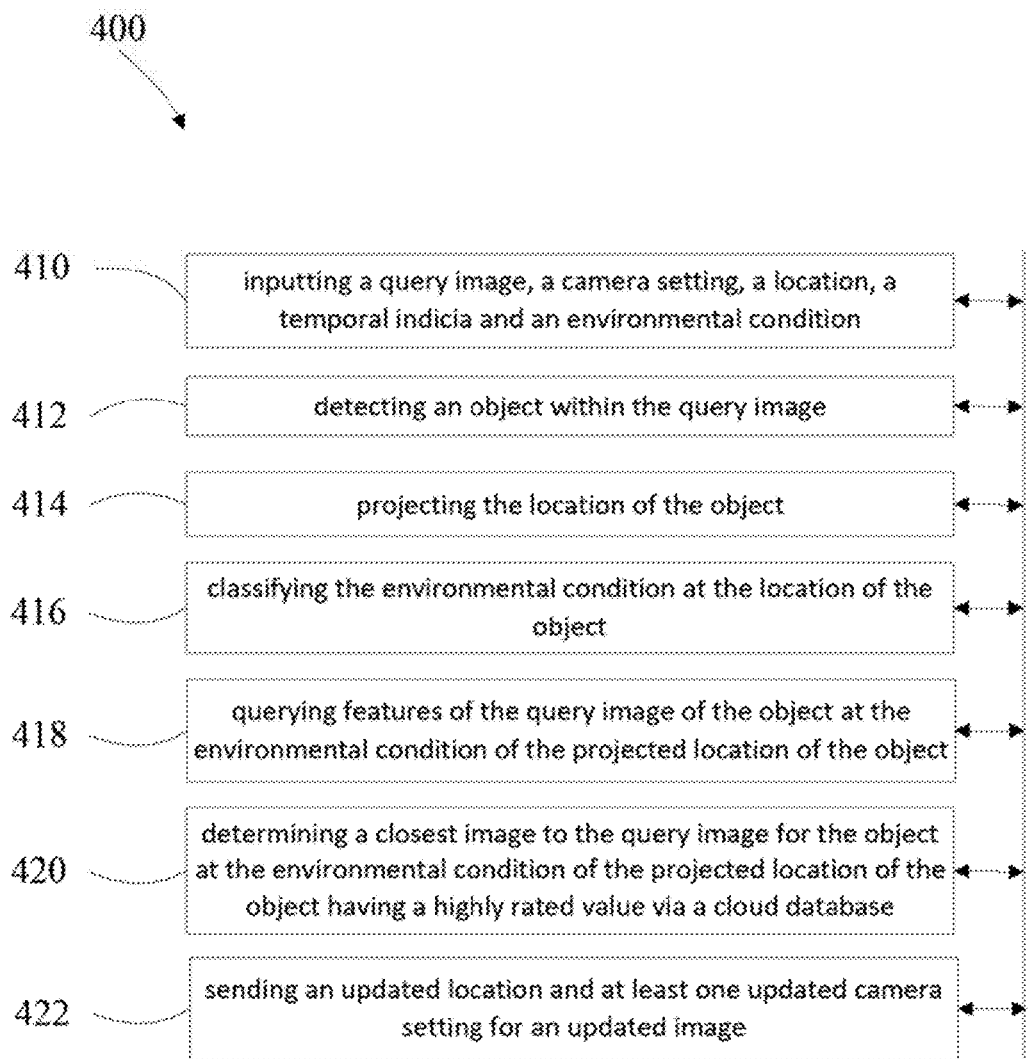
FIG. 4 is an example method in accordance with one embodiment of the disclosure.

FIG. 3 and FIG. 4 depict example photographic feedback methods, comprising, inputting a query image (FIG. 3, 314) (FIG. 4, 410), a camera setting (FIG. 3, 312), a location, a temporal indicia and an environmental condition, detecting (FIG. 3, 318) (FIG. 4, 412) an object within the query image and projecting (FIG. 3, 320) (FIG. 4, 414) the location of the object. The method also includes classifying (FIG. 3, 322) (FIG. 4, 416) the environmental condition at the location of the object and querying (FIG. 3, 326) (FIG. 4, 418) features of the query image of the object at the environmental condition of the projected location of the object. The method further includes determining (FIG. 3, 332) (FIG. 4, 420) a closest image to the query image for the object at the environmental condition of the projected location of the object having a highly rated value via a cloud database (FIG. 3, 310) and sending (FIG. 3, 336) (FIG. 4, 422) an updated location and at least one updated camera setting (FIG. 3, 338) for an updated image.

The method may also include using a cloud database to perform at least one of detecting of the object in the query image, projecting of the location of the object and classifying of the environmental condition and the feature query of the query image. The cloud database may include a collection of worldwide photos inputted under different environmental conditions. The determining the closest image may be based on one of a history and a preference of a user.

The updated location may include at least one of a position of the camera, a position of elements within the updated image, a relative proportion of elements within the updated image, a scene content of the updated image and a position shift and a global position change. The updated location and at least one updated camera setting may be performed in one of real-time and near real-time. The updated location may include navigational instructions to move to the updated location.

The at least one updated camera setting may include adjusting camera settings via instructions sent from the cloud database and may include at least one of ISO, aperture and shutter speed.

The closest image may be selected based on geographical location, mapping the query image to features of cloud database images wherein distance between the features indicates image similarity, focus of the object in the query image that is similar in context and focus to photos within the cloud database and geographical location and the environmental condition.

A query image may be sent to the cloud database to search for similar photos. The query image refers to a sample of the scene captured by the system from the application while the camera is being positioned.

In addition to the image, data collected from the camera hardware may be provided to assist the search process. Several processes may run concurrently, such as object detection, location projection, environment condition classification and feature extraction for comparison to photos in the database for similarity determination.

The query image may be passed to the photo optimization model to improve its ascetic quality by referencing similar looking photos retrieved from the database. Based on the model, suggestions and or directions pertaining to camera position changes and camera settings for better quality photo would be sent to the user or the camera system directly.

Feature Extraction Models

FIG. 3 depicts a feature extraction module 316 where multiple processes may be executed concurrently to extract features from the query image 314 and the cloud database 310. In one embodiment the extracted features are utilized by the recommender model to evaluate the similarity between the query image 314 and the cloud database 310 images and determine those cloud database 310 images which are closest to the query image 314. In one embodiment, the proposed solution maps the images to features in which the distance between the features directly corresponds to the image similarity. Note that perceptual metrics such as mean squared error, peak signal-to-noise ratio or structural similarity index utilized in current systems are not suitable for the proposed solution as it is not measuring the similarity between two identical images.

Object Detection

FIG. 3 depicts an object detection module 318 in which objects of interest appearing in the query image are pinpointed and classified. This feature may provide information pertaining to the context of the photo. It may also indicate the focus of the photo, which may be a factor in ensuring good photo composition. The recommender model may utilize this information to find photos with a similar context and focus. This may provide additional utility when no photo in the database matches the location of the query photo.

Location Projection

FIG. 3 depicts a location projection module 320 in which location information may be particularly useful when photos of tourist attractions are involved, as the recommender model would be able to narrow the search down significantly to photos with scenes that are geographically close. Hence, this model may obtain features regarding the geographical location of the photo. The model may extract the latitude and longitude coordinates from the GPS information from the camera and embed them into the feature. This model may take into account additional factors such as altitude in considering the similarity of images as there is still a notable difference in taking a photo of the same subject from a high view versus a low view.

Environmental Condition Classification

FIG. 3 depicts an environmental condition classification module 322 which may impact the evaluation of the similarity between a query image and a cloud database image based on the conditions in which the photo is taken. This model may extract information regarding the surrounding environment conditions as displayed in the photo. Some factors having an environmental impact are light and weather. A photo of the same scene under different lighting conditions may benefit from a different capture angle to be perceived as an aesthetic photo. Hence, it may be preferable to use photos taken under similar conditions as reference to the query image. To ensure the reliability of the feature extraction the camera information such as time and date may be utilized in conjunction with information obtained visually from the image. Additional sensors may also be available on the camera to provide data such as temperature, haze and humidity. Combining the information collected from the camera hardware sensors, the model may be able to better identify the environment conditions that the user is currently experiencing.

Recommender Models

FIG. 3 depicts a recommender model module 330 of the proposed solution where the cloud database 310 contains a collection of photos taken at various locations worldwide and under different environment settings. In one example embodiment, the quality of the photos is ensured by a data cleaning process conducted by photography experts, in which photos are rated based on its aesthetic quality and those which score below a pre-determined threshold would be removed from the database. For photos in the database, the exchangeable image file format (EXIF) data may also be stored. The EXIF data may provide information regarding the date and time, the camera settings used, the location, and the like for associated photos. The recommender model module 330 may receive database features 324, query features 326 and the user's historical preferences 328 to assist in its determination of the closest image 332 from the database 310.

Given the cloud database, a model may be trained such that for new queries received, the closest images would be returned from the cloud database. Factors which account for the similarity between images may include a geographical location where the photo was taken, surrounding conditions, objects detected in the image and the like. The model may recommend multiple similar photos as reference photographs to improve the quality and composition of the query image. Due to personal preferences, perceptual assessment about the quality of a photo is subjective and differs between users. Hence, the model may take into account the user's history such that recommended images would align with user's preferences.

Photo Optimization Models

FIG. 3 depicts a photo optimization model module 334 of the proposed solution that may include changing the camera position location for taking the photograph and changing camera settings. The photo optimization model module 334 may receive input from the hardware sensor data 312 and the query image 314 from a camera 308.

Camera Position Directions

FIG. 3 depicts the location suggestion module 336 of the photo optimization model module 334 of the proposed solution. On a smaller scale, the photo composition may be improved with some small changes such as tilting the camera up, down or slightly left or right. This may be accomplished by aligning the query image to the reference images with similar context. The location suggestion model may utilize the GPS location of the camera or the accelerometer sensor data of the camera to determine orientation. The model may transform the query image through geometric displacements such that objects and the reference image are aligned. Through this alignment process, information regarding the difference in camera positions between these images may be estimated. Based on this information, the camera position shift in order to achieve the same composition effect as the reference image may be sent as directions to the photographer.

On a larger scale, images may be taken at different but nearby locations based on a 3D virtual space of that region. Reference images may share common objects of interest viewed from different perspectives based on a localized position. From this set of images, a 3D reconstruction may be created and patterns regarding frequently visited locations, resulting in high quality photos, at different times of the day or different environment conditions may be observed. The direction of the sunlight, which in turns affects the exposure, may be incorporated into the 3D reconstruction. By making use of the 3D reconstruction information, the model may project a location to take photos in that region based on a given condition, time and date.

Camera Setting Updates

FIG. 3 depicts the camera setting suggestion module 338 of the photo optimization model module 334 of the proposed solution. Since the EXIF data of the reference images may be extracted from the database, camera settings used while these photos were taken may be available. By referring to those photos taken under the same lighting and environment conditions, at least one updated camera setting, may be determined and suggested to the user or directly changed on the camera to attain a better exposure in the final photo taken. Additionally, in situations where none of the photos in the cloud database have the same lighting and environment conditions, a model may be trained to estimate updated camera setting under various conditions.

The proposed solution may offer immediate on-site photographic feedback to users during photo-taking sessions to achieve esthetic photos.

When extracting information to decide on similar images to retrieve from the database, the system does not solely rely on machine learning models to interpret the information from images, the system uses data collected from hardware such as camera settings, GPS and phone sensors, resulting in high reliability information.

The proposed solution takes into account a users' preference in photo style based on their usage history when deciding on the images to retrieve.

The proposed solution provides feedbacks in terms of executable actions, not just similar reference photos. Thus the solution allows users with minimal photography experience to take high quality photographs as they are given specific directions, navigational instructions and the camera settings are either updated directly or the user is told exactly what camera setting updates to make.

The proposed solution provides suggestions on global position changes based on a model the 3D space of the user's nearby locations to direct a photographer to a better photo-taking location.

The system combines location directions with at least one updated camera setting to change for further improvement in the photo quality.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment." "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A photographic feedback method, comprising:
   inputting a query image, a camera setting, a location, a temporal indicia and an environmental condition;
   modeling a three-dimensional space of the location near the query image;
   detecting an object within the query image;
   projecting the location of the object in the modeled three-dimensional space based on the temporal indicia;
   classifying the environmental condition at the location of the object;
   querying features of the query image of the object at the environmental condition of the projected location of the object;
   determining a closest image to the query image for the object at the environmental condition of the projected location of the object having a highly rated value via a cloud database; and
   sending an updated location in the modeled three-dimensional space and at least one updated camera setting for an updated image.

2. The photographic feedback method of claim 1, wherein the at least one updated camera setting includes at least one of an ISO, an aperture and a shutter speed.

3. The photographic feedback method of claim 1, wherein the detecting of the object in the query image is performed via the cloud database.

4. The photographic feedback method of claim 1, wherein the projecting of the location of the object in the modeled three-dimensional space is performed via the cloud database.

5. The photographic feedback method of claim 1, wherein the classifying of the environmental condition is performed via the cloud database.

6. The photographic feedback method of claim 1, wherein the feature query of the query image is performed via the cloud database.

7. The photographic feedback method of claim 1, wherein the cloud database includes a collection of worldwide photos inputted under different environmental conditions.

8. The photographic feedback method of claim 1, wherein the determining the closest image is based on one of a history and a preference of a user.

9. The photographic feedback method of claim 1, wherein the updated location in the modeled three-dimensional space includes a position of the camera.

10. The photographic feedback method of claim 1, wherein the updated location in the modeled three-dimensional space includes a position of elements within the updated image.

11. The photographic feedback method of claim 1, wherein the updated location in the modeled three-dimensional space includes a relative proportion of elements within the updated image.

12. The photographic feedback method of claim 1, wherein the updated location in the modeled three-dimensional space includes a scene content of the updated image.

13. The photographic feedback method of claim 1, wherein the updated location in the modeled three-dimensional space includes one of a position shift and a global position change.

14. The photographic feedback method of claim 1, wherein the sending of the updated location in the modeled three-dimensional space and the at least one updated camera setting is performed in one of real-time and near real-time.

15. The photographic feedback method of claim 1, wherein the updated location in the modeled three-dimensional ac includes navigational instructions.

16. The photographic feedback method of claim 1, wherein the at least one updated camera setting includes adjusting camera settings via instructions sent from the cloud database.

17. The photographic feedback method of claim 1, wherein the closest image is selected based on geographical location.

18. The photographic feedback method of claim 1, wherein the closest image is selected based on mapping the query image to features of cloud database images and wherein distance between the features indicates image similarity.

19. The photographic feedback method of claim 1, wherein the closest image is selected based on a focus of the object in the query image that is similar in context and focus to photos within the cloud database.

20. The photographic feedback method of claim 1, wherein the closest image is selected based on geographical location and the environmental condition.

* * * * *